(12) United States Patent
Hagg et al.

(10) Patent No.: US 7,342,531 B2
(45) Date of Patent: Mar. 11, 2008

(54) REDUNDANT LEVEL MEASUREMENT IN RADAR LEVEL GAUGING SYSTEM

(75) Inventors: Lennart Hagg, Kungsbacka (SE); Lars Ove Larsson, Linkoping (SE); Mikael Kleman, Vreta Kloster (SE); Per Holmberg, Linkoping (SE)

(73) Assignee: Rosemount Tank Radar AB, Gothenburg (SE)

( * ) Notice: Subject to any disclaimer, the term of this patent is extended or adjusted under 35 U.S.C. 154(b) by 87 days.

(21) Appl. No.: 11/358,773

(22) Filed: Feb. 21, 2006

(65) Prior Publication Data

US 2007/0194981 A1 Aug. 23, 2007

(51) Int. Cl.
  *G01S 13/08* (2006.01)
  *G01F 23/00* (2006.01)
  *G01F 23/14* (2006.01)
  *G01S 13/00* (2006.01)

(52) U.S. Cl. ............... 342/124; 342/118; 342/165; 342/173; 342/175; 342/195; 73/290 R; 324/629; 324/637; 324/642

(58) Field of Classification Search ............... 340/540, 340/603, 612, 618; 342/89–103, 118, 124, 342/165–175, 195; 73/290 R, 293, 299–322.5; 324/629, 637, 642–646
See application file for complete search history.

(56) References Cited

U.S. PATENT DOCUMENTS

| | | | | |
|---|---|---|---|---|
| 3,995,212 A | * | 11/1976 | Ross | 324/642 |
| 4,044,353 A | * | 8/1977 | Levy | 342/124 |
| 4,485,673 A | * | 12/1984 | Stern | 73/304 C |
| 4,489,601 A | * | 12/1984 | Rao et al. | 73/290 R |
| 4,642,777 A | * | 2/1987 | Schwanke | 324/642 |
| 5,115,242 A | * | 5/1992 | Nagamune et al. | 342/124 |
| 5,321,408 A | * | 6/1994 | Jean et al. | 342/124 |
| 6,292,131 B1 | * | 9/2001 | Wilke et al. | 342/124 |
| 6,337,655 B1 | * | 1/2002 | Wilkie et al. | 342/124 |
| 6,538,598 B1 | * | 3/2003 | Wilkie et al. | 342/124 |
| 6,606,905 B2 | * | 8/2003 | Carroll et al. | 73/299 |
| 6,672,155 B2 | * | 1/2004 | Muller et al. | 73/290 V |
| 6,914,555 B2 | * | 7/2005 | Lipscomb et al. | 342/124 |
| 2003/0033871 A1 | | 2/2003 | Carroll et al. | |
| 2003/0131661 A1 | | 7/2003 | Molina et al. | |
| 2004/0140814 A1 | | 7/2004 | Bletz et al. | |
| 2005/0035769 A1 | | 2/2005 | Otto et al. | |
| 2005/0088307 A1 | | 4/2005 | Schaffer et al. | |

* cited by examiner

*Primary Examiner*—Bernarr E. Gregory
(74) *Attorney, Agent, or Firm*—Westman, Champlin & Kelly, P.A.

(57) ABSTRACT

A method and system for determining a product level in a tank which determine a first level measure using emission of electromagnetic waves into the tank, detect a differential pressure, determine an observed density based on the detected differential pressure and the first level measure, and determine a second level measure based on the observed density and a currently measured differential pressure. The present invention is based on the realization that a level measurement based on differential pressure and an observed density can provide a valuable redundant level measurement, which can provide increased reliability and enable detection of errors.

16 Claims, 4 Drawing Sheets

REDUNDANT LEVEL MEASUREMENT IN RADAR LEVEL GAUGING SYSTEM

FIELD OF THE INVENTION

The present invention relates to radar level gauging, i.e. using electromagnetic waves for determining a level of a product in a tank. More specifically, the invention relates to determining a redundant level measure that can be used to improve the performance of a radar level gauge (RLG).

BACKGROUND OF THE INVENTION

Radar level gauging is based on allowing electromagnetic waves propagate into a tank and be reflected by the surface of a product in the tank. The reflected signal is then received and processed in order to identify an echo, i.e. the reflection from the surface. In order to be accurate, it is important that the surface echo can be distinguished from other disturbing reflections. Such reflections may result from internal tank geometry such as flanges, stirring devices, filling nozzles, etc, or from physical properties of the product, such as turbulence, foam, etc.

Considerable effort is made to ensure that the algorithm used to identify the surface echo is successful, so that a correct level measurement is provided.

Also for other reasons it may be appropriate to provide a redundant level measurement, i.e. to handle a gauge failure of some kind. Such a failure can be e.g. a mechanical or electrical fault in the gauge.

GENERAL DISCLOSURE OF THE INVENTION

An object of the present invention is to overcome the above problems, and to provide a redundant level value in a radar level gauge. According to one embodiment, the redundant level value can be used to improve the robustness of the radar level gauging.

According to a first aspect of the invention, this and other objects are achieved by a method for determining a product level in a tank, comprising emitting an electromagnetic signal into the tank, receiving a reflected signal reflected from a surface of the product, determining a first level measure of the product level based on a relationship between the emitted signal and the reflected signal, detecting a first differential pressure between tank atmosphere and the product at a first predefined level in the tank, determining an observed density based on the differential pressure and the first level measure, storing a value of the observed density, detecting a second differential pressure between tank atmosphere and the product at a second predefined level in the tank, and determining a second level measure of the product level based on the stored density value and the second differential pressure.

According to a second aspect of the invention, this and other objects are achieved by a radar level gauge for determining a product level in a tank, comprising a transmitter for generating an electromagnetic signal, means for guiding the signal into the tank, and allowing it to propagate towards the product in the tank, a receiver for receiving a reflected signal, at least one sensor for detecting a differential pressure between the product in a bottom region of the tank and the tank atmosphere, processing circuitry adapted to determine a first level measure of the product level based on a relationship between the emitted signal and the reflected signal and to determine an observed density based on the differential pressure and the current level measure, a memory for storing a value of the observed density, wherein the processing circuitry is further adapted to determine a second level measure, based on the stored value of the observed density and a currently detected differential pressure.

The tank atmosphere refers to the gas above the product surface. The tank atmosphere has a homogenous pressure, which can be atmospheric (i.e. normal air pressure), but may also be an over pressure or under pressure, in case of an air tight tank.

In order to determine the observed density, the detected first differential pressure and the level distance from the surface to the first predefined level will be required. If the first differential pressure is related to the pressure at the bottom of the tank, the first level measure can be used directly. If the differential pressure is related to the pressure at some other predefined level, the first level measure must be adjusted for the level distance from this predefined level to the bottom of the tank.

Similarly, the detected second differential pressure and the stored observed density will be used to determine the level distance form the surface to the second predefined level. Any level distance between the second predefined level and the bottom of the tank must be added to this determined level distance in order to obtain the second level measure.

Preferably, the first and second predefined levels are in a bottom region of the tank, and most preferably at the very bottom of the tank. The term bottom region includes, but is not limited to, a position at a lowest point of the tank and a position at the bottom of the tank essentially vertically below the radar level gauge.

Generally, it seems more advantageous from a level measuring point of view to enable pressure measuring at a low position. One reason for this is that it would allow a more complete level measuring range based on the pressure measuring. The density based measuring method will only provide correct results as long as the product level stays above the first and second predefined levels. It also simplifies the calculations. However, there may be several constraints that lead to a selection of positions for pressure measuring.

The principle of determining a product level in a tank based on density and differential pressure per se is well know in the art, and is described for example in US patent application Ser. No. 2003/0033871 by Carroll et al. However, this principle has been used in situations where other means for determining the product level are not used, e.g. as a substitution for radar level gauging. As the result typically is less accurate than what can be accomplished with a radar level gauge, there has been no reason to contemplate this principle in situations where highly accurate RLG systems have been implemented.

The present invention is based on the realization that a level measurement based on differential pressure and an observed density can provide a valuable redundant level measurement. Such a redundant measurement can provide increased reliability and enable detection of errors. Some examples of how this redundant measure can be used will be described in relation to particularly preferred embodiments of the present invention.

According to one embodiment, the redundant measure is fed back to the processing circuitry, so that the step of determining the first product level measure is based also on the second level measure. More precisely, the density based level measure can be used as a starting estimate of where the surface echo most likely will be located. Such a starting estimate will increase the probability that the correct echo is identified as the surface echo, thus leading to a more robust detection of surface echo.

According to a further embodiment, the redundant measure is compared to the RLG-measurement, to identify any deviation greater than a given threshold. Under the assumption that the density is essentially constant, the density based level value should not deviate significantly from the actual product level, and such a deviation thus indicates that the radar level gauge is providing erroneous information, e.g. has substituted the surface echo with a disturbing echo. This information can be used for example to alert a user that the RLG-measurement possibly is wrong. Alternatively, or in combination, in a user interface where the current product level is indicated, the RLG measure can be replaced with the density based level measure.

BRIEF DESCRIPTION OF THE DRAWINGS

These and other aspects of the present invention will be described in more detail with reference to the appended drawings, illustrating presently preferred embodiments.

DETAILED DESCRIPTION OF PREFERRED EMBODIMENTS

Figure 1:
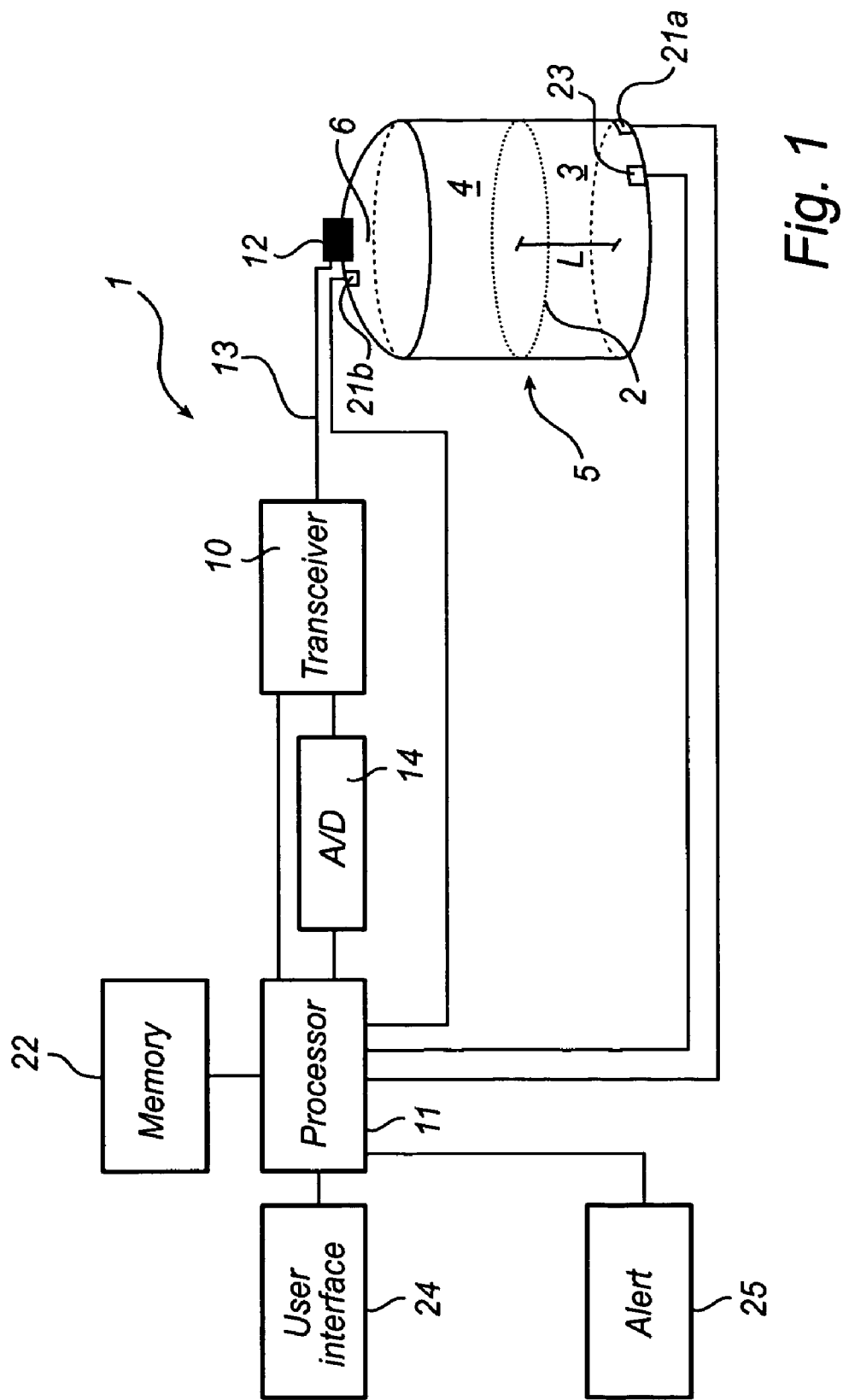
FIG. 1 shows a schematic block diagram of a radar level gauge system according to an embodiment of the present invention.

FIG. 1 schematically shows a radar level gauge (RLG) system 1 according to an embodiment of the present invention.

The RLG 1 is arranged to determine a product level in a tank, i.e. the level of an interface 2 between two (or more) materials 3, 4 in the tank 5. Typically, the first material 3 is a product stored in the tank, e.g. a liquid such as gasoline, while the second material 4 is air or some other atmosphere. In that case, the RLG will enable detection of the level of the surface of the product in the tank. Typically, only the level of a first liquid surface is measured, and/or a second liquid surface if the first liquid is sufficiently transparent.

The RLG 1 comprises a transceiver 10, controlled by a processor 11, a signal medium interface 12, and a signal transfer medium 13 connecting the transceiver 10 to the signal medium interface 12. The transceiver 10 is arranged to provide electromagnetic signals to the signal medium interface 12 and to receive a reflected signal. An A/D-converter 14 is adapted to digitize the received tank signal, before it is provided to the processor 11.

In a pulsed system, the transceiver 10 can comprise a pulse generator. In case the RLG is intended to emit microwaves, the transceiver 10 can comprise a microwave transmitter, a microwave receiver, a circulator and any control circuitry required to manage these components. The microwave transmitter can be arranged to generate modulated pulses or a frequency modulated microwave signal.

The signal medium interface 12 acts as an adapter, enabling the signal generated in the transceiver 10 to propagate into the tank 5 and be reflected by the surface of the material 3, and to return the received tank signal to the transceiver 10.

The signal transfer medium 13 can be a wire or cable, but can also include more sophisticated wave guides. In case of a explosive or otherwise dangerous content in the tank 5, the signal transfer medium 13 may include an air tight seal passing through the tank wall. It is also possible that the transceiver 10 is connected directly to the signal medium interface 12 with a suitable terminal, or that the signal medium interface 12 is arranged on the same circuit board as the transceiver 10, in which case the signal transfer medium simply may be a track on the circuit board.

Figure 2:
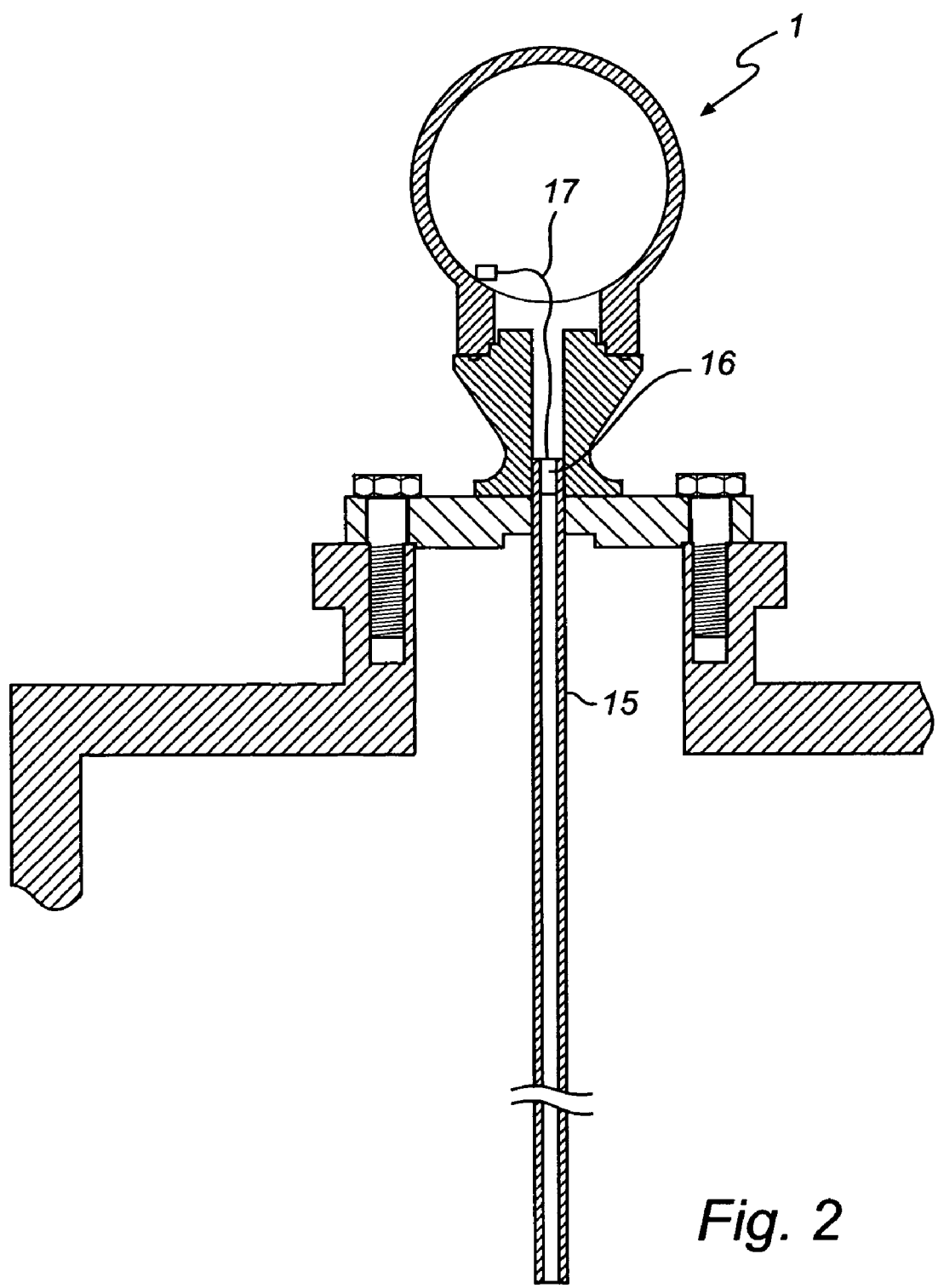
FIG. 2 shows a guided wave radar level gauge mounted on a tank.

In one example of a RLG, shown in more detail in FIG. 2, the signal medium interface 12 is a wave guiding structure 15 extending into the content of the tank. The wave guiding structure 15 can be a hollow wave guide or some sort of probe, such as a coaxial probe, a twin (wire) probe, or a single (wire) probe (also referred to as a surface wave guide). Electromagnetic waves transmitted along the structure will be reflected by any interface 2 between materials in the tank, and the reflection will be transmitted back to the signal transfer medium 13, here in the form of a coaxial connector 16 and coaxial cable 17.

As mentioned, an RLG as shown in FIG. 2 is referred to as a guided wave radar (GWR) system, and is typically suitable when the transmitted signals are unmodulated DC pulses, but can also be used for transmitting high frequency (micro wave) signals.

Figure 3:
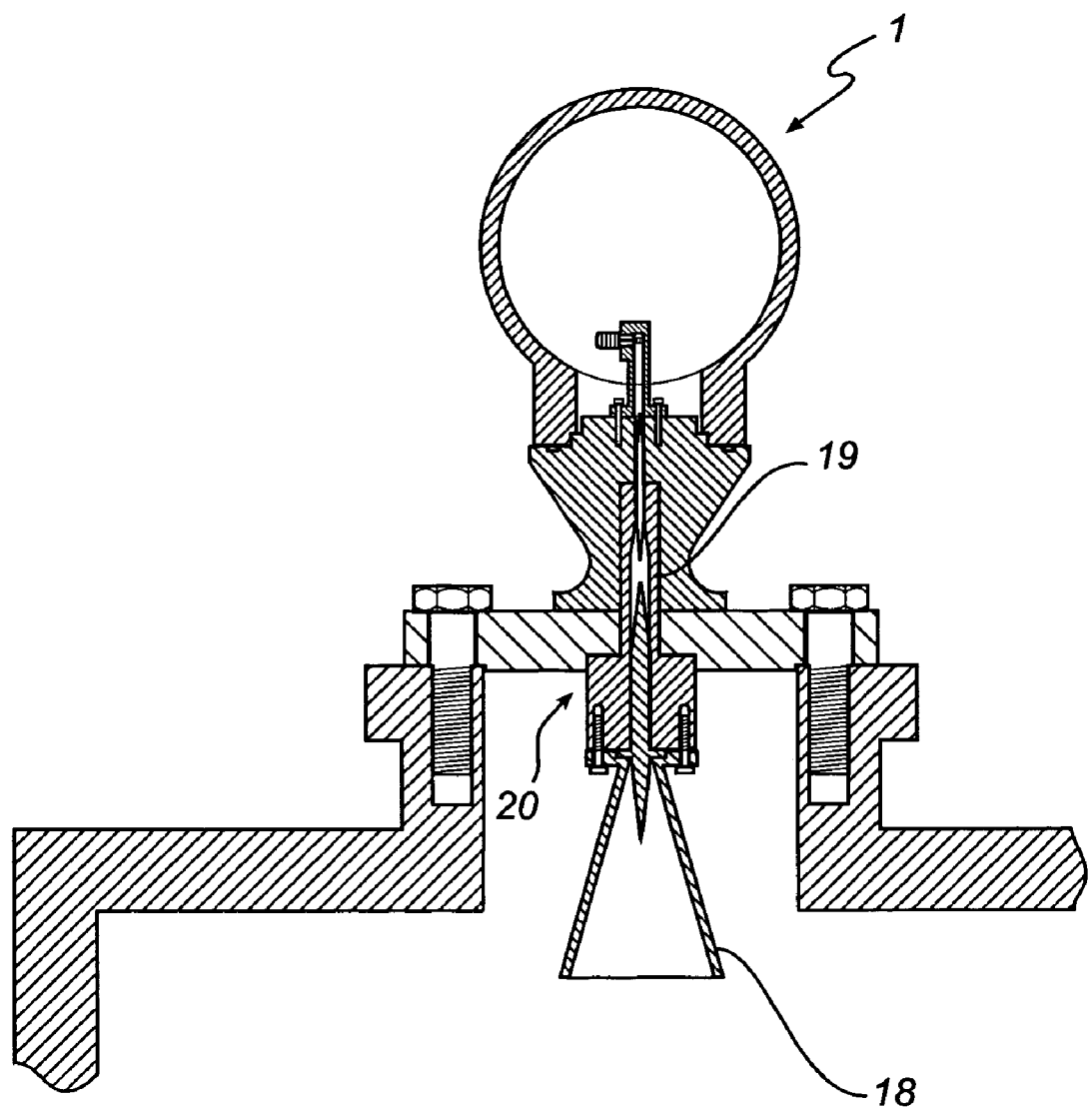
FIG. 3 shows a free propagating radar level gauge mounted on a tank.

In another example, shown in more detail in FIG. 3, the signal medium interface 12 is instead a radar antenna 18, arranged to emit the transmitted waves to freely propagate into the tank, and to receive waves that are reflected by any interface 2 between materials in the tank. The signal transfer medium is here a wave guide 19 provided with an air tight seal 20.

Such a system is referred to as a free propagating radar system, and is suitable when the signal is a high frequency (micro wave) signal.

Returning to FIG. 1, the processor 11 is arranged to determine a measurement result based on a relation between transmitted and received signals. The transceiver 10 is adapted to generate an electromagnetic signal in accordance with control data from the processor 11.

In use, the processor 11 controls the transceiver 10 to generate and transmit a measurement signal to be emitted into the tank 5 by the signal medium interface 12. In the case of pulsed radar gauging, the signals can be DC pulses or pulses modulated on a carrier wave of a GHz frequency (microwaves). The pulses typically have a length of about 2 ns or less, with a pulse repetition frequency in the order of MHz, at average power levels in the mW or μW area. In the case of Frequency Modulated Continuous Wave, FMCW, the signal can be a continuous signal with a frequency varying over a certain range (Frequency Modulated Continuous Wave, FMCW).

A tank signal, i.e. the signals reflected from the tank interior and any contents therein, or a mix of emitted and reflected signals, is received by the signal medium interface 12, communicated to the transceiver 10, and A/D converted by converter 14. The digitized tank signal is then provided to the processor 11, and the processor 11 determines a measurement result based on a relation between the emitted and received waves. The measurement result is used to calculate the product level L in the tank, i.e. the distance from the bottom of the tank to the product surface 6.

The RLG 1 can include a user interface 24, in order to present the measured product level to a user. It can also include an alert unit 25, arranged to alert a user of any abnormal or potentially dangerous situation.

The illustrated embodiment of the system also comprises at least one sensor 21a, 21b for determining a differential pressure, dP, between the pressure P1 of the product 3 in a predefined level $L_{A1}$ in the tank, here at the bottom of the tank, and the tank atmosphere pressure P2, i.e. the pressure of the material 4 at a point above the product surface 2.

If the tank atmosphere is held at atmospheric pressure (i.e. no over-pressure in the top of the tank), dP can be determined by a gauge pressure transmitter 21a, i.e. measuring pressure with reference to atmospheric pressure, arranged at the predefined level $L_{A1}$, here in a bottom region of the tank.

If the tank is held at a pressure P2 different from air pressure, e.g. at an increased pressure, it is required to determine the differential pressure with reference to this pressure P2. This can be accomplished with a second gauge pressure transmitter 21b arranged in a location above the product surface, preferably close to the top of the tank. The differential pressure is then the difference between the two measured pressures. Alternatively, the pressure transmitter 21a at the predefined level $L_{A1}$ can be a differential pressure transmitter with reference to the tank atmosphere pressure P2. Such a transmitter can be accomplished by providing a conduit (not shown) from the tank atmosphere to the pressure transmitter 21a.

The differential pressure dP can be provided to the RLG 1 in digital form, e.g. via a field bus interface, or in analogue form, e.g. via a 4-20 mA interface. In the latter case, an A/D-conversion is made, in order to provide a digitized value. Based on a first detected differential pressure dP and the product level L determined by the level gauge, the processing circuitry 11 is adapted to determine an observed product density, ρ, according to:

$$\rho = \frac{dP}{(L - L_{A1}) * g}, \quad (1)$$

where g is the local gravity constant. Note that the level $L_{A1}$ in the illustrated example is essentially zero, as the pressure transmitter 21a is placed at the bottom of the tank.

According to an embodiment of the present invention, this measure of the observed density is stored in a memory 22 connected to the processor 11. The memory can be a RAM, flash memory, EEPROM or any other type of writeable storage medium. The processing circuitry is further adapted to determine the a density based level value, $L_\rho$, based on the stored density ρ and a second detected differential pressure dP, according to:

$$L_\rho = \frac{dP}{\rho * g} + L_{A2} \quad (2)$$

where $L_{A2}$ is the level where the second differential pressure is detected. This level can of course be equal to the level $L_{A1}$, e.g. the same pressure transmitter 21a is used to detect the first and second differential pressure. It should be noted that the predefined level $L_{A2}$ typically is equal to the predefined level $L_{A1}$, as typically the differential pressure is detected by the same sensor. Preferably, they are both essentially zero.

As long as the density of the product has not changed significantly since the observed density was determined according to eq. 1 and stored in the memory 22, this calculation will provide a redundant measure of the product level.

Note that the observed density may depend on various factors, including temperature, T. In order to further improve the accuracy of the redundant measure, the observed density ρ can be adjusted for a varying temperature of the product in the tank. For this purpose, the gauging system also comprises a temperature sensor 23 for providing the temperature of the product in the tank to the processor 11. Based on the observed density and the measured temperature, the processor is adapted to calculate a reference density, $\rho_{ref}$, i.e. a density normalized with respect to temperature, and to store this reference density. The stored reference density $\rho_{ref}$ and the current product temperature T are then used to calculate an actual density, $\rho = \rho(\rho_{ref}, T)$.

Of course, other factors influencing the density of the product in the tank can be handled in a similar fashion, in order to further improve the accuracy of the redundant level measure.

Figure 4:
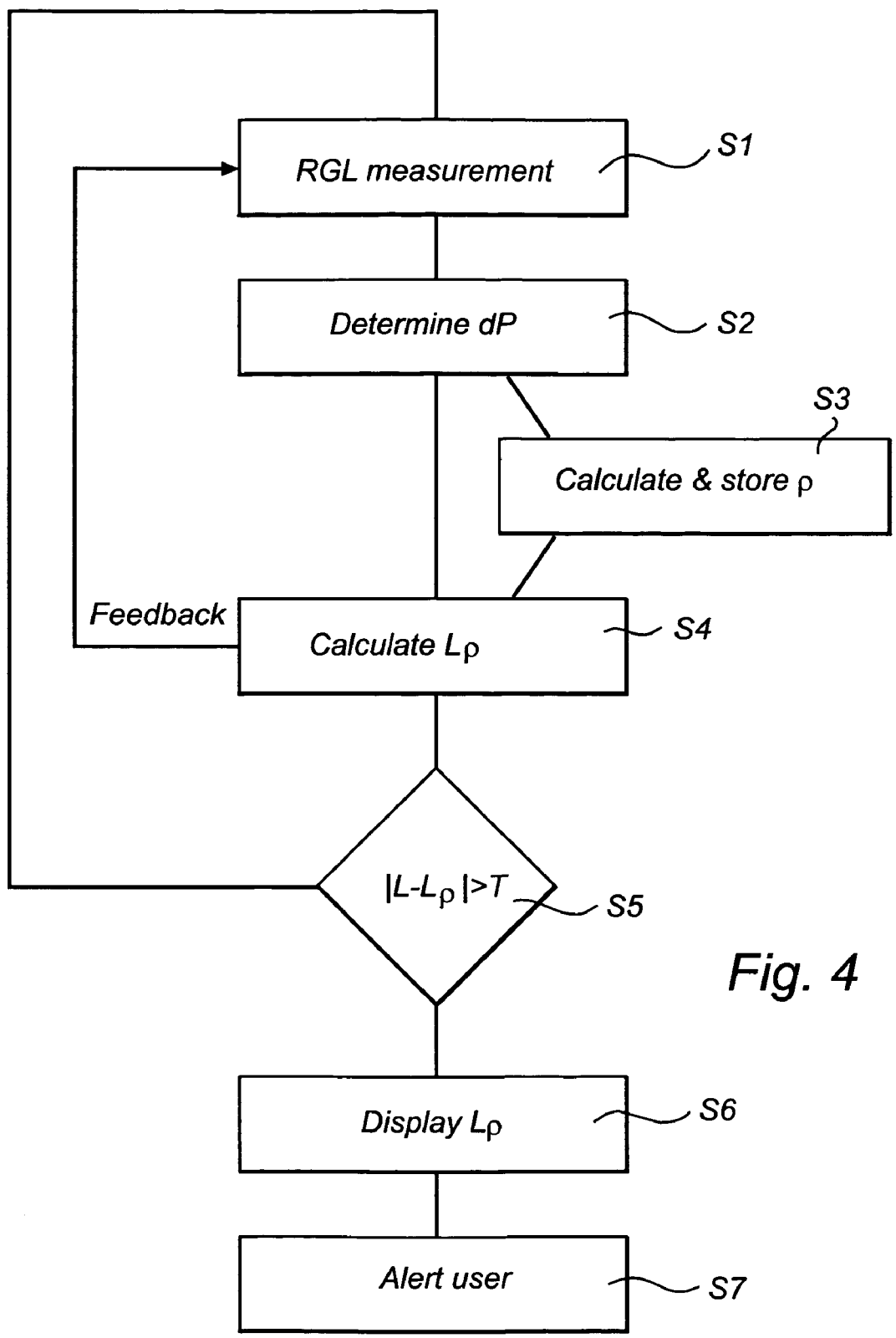
FIG. 4 is a flow chart of a method according to an embodiment of the invention.

A schematic flow chart of an embodiment of the method according to the invention is shown in FIG. 4.

First, in step S1, the RLG 1 determines the product level L in the tank, by emitting electromagnetic waves into the tank and receiving a reflection including an echo from the product surface. In step S2, the differential pressure dP in the tank is determined, using pressure sensor 21a, and, if required, also sensor 21b. Then, in step S3, the observed (actual) density ρ is determined using eq. 1 above, and stored in memory 22.

As mentioned above, the observed density can be normalized with respect to temperature and/or other entities that influence the actual density of the product, and a normalized reference density is stored in the memory 22, according to $\rho_{ref} = \rho_{ref}(\rho, T)$.

Depending on the implementation step S3 may be performed at regular time intervals, at given differential pressure levels, or when certain events take place (such as when filling or emptying of the tank is commenced, etc). Between each occasion that step S3 is performed, the stored density value will be assumed to be a correct estimate of the product density. As described above, based on this assumption the density value can be used to determine a redundant value of the product level.

In step S4, the redundant level value $L_\rho$ is determined according to eq. 2 above. If a reference density is stored in the memory 22 instead of actual density, this reference density must first be transformed into an actual density using measurements of the entities that were used to normalize it (e.g. temperature) according to the relationship $\rho = \rho(\rho_{ref}, T)$.

The redundant level value may be used in various ways, some of which will be described in the following.

In one embodiment, the density based level value $L_\rho$ is fed back to step S1, where it is used as an approximation, or starting point, when determining the radar level gauged measurement. This will allow the detection algorithm in the RLG 1 to define a range in which the surface echo should be detected. Any echo detected outside this range can be disregarded as a disturbing echo.

In another embodiment, the difference between the density based level value and the measured product level is compared to a threshold value T, as indicated in step S5. Such a comparison will detect if the radar measured tank level diverges from and the density based tank level. If an when such a diversion is detected, appropriate measures may be taken in the following steps.

It is evident that there will be no deviation during a cycle in which the observed density is determined and stored, as the redundant level by definition will be identical to the RLG measurement. For the following cycles, however, when the RLG measurement is based on analysis of recently reflected signals, and the redundant level is based on detected differential pressure and the stored density value, such deviation may occur, for example if the RLG measurement is erroneous.

If a deviation is detected in step S5, a product level value that is presented to the user via interface 24 may in step S6 be changed from the RLG value to the redundant, density based value, together with an indication that the radar measured tank level is no longer considered to be accurate.

Further, such a detection in step S5 may in step S7 result in an alarm on the alert device 25, making the user ware of the fact that the radar measurement is no longer accurate.

As indicated in FIG. 4, the same threshold value T in step S5 may be used for the actions in both steps S6 and S7. Alternatively, and preferably, different threshold values, e.g. T1 and T2, are used to trigger different actions.

It should be understood that the above described functionality can be implemented in software loaded into the memory 22 and executed by the processor 11. Alternatively, or in combination, some parts of the described functionality, e.g. the calculation of the redundant product level in step S4, can be implemented in hardware. The software and hardware may be adapted based on the application of use and the installation of the radar level gauge.

The person skilled in the art realizes that the present invention by no means is limited to the preferred embodiments described above. On the contrary, many modifications and variations are possible within the scope of the appended claims. For example, the block diagrams are only intended to schematically show the design of the radar level gauging system and its function. Further, many variations of the described functions are possible, by adaptation of software/hardware in the RLG 1.

A method and system for determining a product level in a tank, comprising determining a first level measure using emission of electromagnetic waves into the tank, detecting a differential pressure, determining an observed density based on the detected differential pressure and the first level measure, and determining a second level measure based on the observed density and a currently measured differential pressure.

What is claimed is:

1. A method for determining a product level in a tank, comprising:
    emitting a microwave signal into said tank,
    receiving a reflected signal reflected from a surface of said product,
    determining a first level measure of said product level based on a relationship between said emitted signal and said reflected signal,
    detecting a first differential pressure between tank atmosphere and the product at a first predefined level in said tank,
    determining an observed density based on said differential pressure and said first level measure,
    storing a value of said observed density,
    detecting a second differential pressure between tank atmosphere and the product at a second predefined level in said tank,
    determining a second level measure of said product level based on said stored density value and said second differential pressure.

2. The method according to claim 1, wherein said first predefined level is equal to said second predefined level.

3. The method according to claim 1, wherein at least one of said first and second predefined levels is in a bottom region of said tank.

4. The method according to claim 1, wherein said step of determining a first level measure is repeated, and said second level measure is used as input in said repeated step of determining a first level measure.

5. The method according to claim 1, further comprising determining a difference between said second level measure and said first level measure.

6. The method according to claim 5, further comprising establishing if said first level measure deviates from said second level measure more than a first predetermined threshold, and generating an alert signal if said first threshold is exceeded.

7. The method according to claim 5, further comprising establishing if said first level measure deviates from said second level measure more than a second predetermined threshold, and presenting said first level measure to a user and replacing said first level measure with said second level measure if said second threshold is exceeded.

8. The method according to claim 1, wherein said observed density ($\rho$) is determined according to $$\rho = \frac{dP}{(L - L_{A1}) * g}$$

wherein dP is the differential pressure, L is the first level measure, $L_{A1}$ is the first predefined level, and g is the local gravity constant, and wherein said second level measure ($L_\rho$) is determined according to $$L_\rho = \frac{dP}{\rho * g} + L_{A2}$$

wherein dP is the differential pressure, $\rho$ is the observed density, g is the local gravity constant, and $L_{A2}$ is the second predefined level.

9. The method according to claim 1, wherein said density value is a reference density equal to the observed density normalized with respect to temperature.

10. A radar level gauging system for determining a product level in a tank, comprising:
    a transmitter for generating a microwave signal,
    means for guiding said signal into the tank, and allowing said signal to propagate towards the product in the tank,
    a receiver for receiving a reflected signal,
    at least one sensor for detecting a first differential pressure between tank atmosphere and the product at a first predefined level in said tank and a second differential pressure between tank atmosphere and the product at a second predefined level in said tank,
    processing circuitry that determines a first level measure of said product level based on a relationship between said emitted signal and said reflected signal and that determines an observed density based on said first differential pressure and said first level measure,
    a memory for storing a value of said observed density,
    wherein said processing circuitry is further determines a second level measure of said product level, based on said stored value of said observed density and said second differential pressure.

11. The radar level gauging system according to claim 10, wherein said first predefined level is equal to said second predefined level.

12. The radar level gauging system according to claim 10, wherein at least one of said first and second predefined levels is in a bottom region of said tank.

13. A radar level gauging system according to claim 10, wherein said processing circuitry further uses said second level measure, when available, to determine said first level measure.

14. A radar level gauging system according to claim 10, wherein said processing circuitry determines a difference between said second level measure and said first level measure.

15. A radar level gauging system according to claim 14, wherein said processing circuitry establishes if said first level measure deviates from said second level measure more than a first predetermined threshold, and generate an alert signal if said first threshold is exceeded.

16. A radar level gauging system according to claim 14, further comprising a user interface for presenting said first level measure to a user, said processing circuitry establishes if said first level measure deviates from said second level measure more than a second predetermined threshold, and replace said first level measure with said second level measure if said second threshold is exceeded.

* * * * *